US006180549B1

(12) United States Patent
Mazany et al.

(10) Patent No.: US 6,180,549 B1
(45) Date of Patent: Jan. 30, 2001

(54) MODIFIED ZEOLITES AND METHODS OF MAKING THEREOF

(75) Inventors: Anthony M. Mazany; Carole A. Lepilleur, both of Akron; Arthur L. Backman, Brecksville; David L. Milenius, Rocky River, all of OH (US)

(73) Assignee: The B. F. Goodrich Company, Brecksville, OH (US)

( * ) Notice: Under 35 U.S.C. 154(b), the term of this patent shall be extended for 0 days.

(21) Appl. No.: 09/151,379

(22) Filed: Sep. 10, 1998

(51) Int. Cl.[7] .................................................. B01J 29/06
(52) U.S. Cl. ................................ 502/64; 502/60; 502/85
(58) Field of Search ................................ 502/60, 62, 64, 502/85

(56) References Cited

U.S. PATENT DOCUMENTS

| | | |
|---|---|---|
| 2,848,346 | 8/1958 | Bertorelli . |
| 2,882,243 | 4/1959 | Milton . |
| 2,882,244 | 4/1959 | Milton . |
| 2,979,381 | 4/1961 | Gottstine . |
| 2,992,068 | 7/1961 | Haden et al. . |
| 2,995,423 | 8/1961 | Breck et al. . |
| 2,996,358 | 8/1961 | Milton . |
| 2,996,489 | 8/1961 | Dannis et al. . |
| 3,008,803 | 11/1961 | Milton . |
| 3,010,789 | 11/1961 | Milton . |
| 3,011,869 | 12/1961 | Breck et al. . |
| 3,054,769 | 9/1962 | Pike . |
| 3,071,434 | 1/1963 | Erlton et al. . |
| 3,100,762 | 8/1963 | Shockney . |
| 3,114,603 | 12/1963 | Howell . |
| 3,130,007 | 4/1964 | Breck . |
| 3,245,946 | 4/1966 | O'Connor . |
| 3,313,594 | 4/1967 | Wilson, Jr. . |
| 3,321,272 | 5/1967 | Kerr . |
| 3,428,595 | 2/1969 | Tsukada et al. . |
| 3,433,587 | 3/1969 | Haden, Jr. . |
| 3,506,637 | 4/1970 | Makino et al. . |
| 3,516,786 | 6/1970 | Maher et al. . |
| 3,518,206 | 6/1970 | Sowards et al. . |
| 3,528,615 | 9/1970 | Kokotailo . |
| 3,532,612 | 10/1970 | Weben et al. . |
| 3,534,013 | 10/1970 | Wakabayashi et al. . |
| 3,591,571 | 7/1971 | Steinbach-Van Gaver . |
| 3,730,943 | 5/1973 | Weisfeld . |
| 3,842,016 | 10/1974 | Young et al. . |
| 3,844,977 | 10/1974 | Young . |
| 3,864,282 | 2/1975 | Young . |
| 3,894,983 | 7/1975 | Higbee . |
| 4,000,100 | 12/1976 | Baldyga . |
| 4,049,517 | 9/1977 | Adachi et al. . |
| 4,060,508 | 11/1977 | Sugahara et al. . |
| 4,113,659 | 9/1978 | Michalko . |
| 4,134,965 | 1/1979 | Rein et al. ............................ 423/328 |
| 4,198,320 | 4/1980 | Chester et al. . |
| 4,250,081 | 2/1981 | Bode et al. . |
| 4,307,010 | 12/1981 | Sandler et al. . |
| 4,338,226 | 7/1982 | Worschech et al. . |
| 4,350,798 | 9/1982 | Parker . |
| 4,371,656 | 2/1983 | Kashiwase et al. . |
| 4,377,459 | 3/1983 | Parker . |
| 4,400,366 | 8/1983 | Sanders . |
| 4,406,822 | 9/1983 | Sanders et al. . |
| 4,406,823 | 9/1983 | Laurent et al. . |
| 4,412,898 | 11/1983 | Olson et al. . |
| 4,540,727 | 9/1985 | Vogdes . |
| 4,581,214 | 4/1986 | Young . |
| 4,585,640 | * 4/1986 | Desmond et al. . |
| 4,741,779 | 5/1988 | Mita et al. . |
| 4,758,328 | 7/1988 | Young . |
| 4,758,619 | 7/1988 | Mita et al. . |
| 5,004,776 | 4/1991 | Tadenuma et al. . |
| 5,013,700 | * 5/1991 | Falth et al. . |
| 5,200,058 | 4/1993 | Beck et al. ............................ 208/46 |
| 5,216,058 | 6/1993 | Visneski . |
| 5,216,088 | 6/1993 | Cinadr et al. . |
| 5,340,880 | 8/1994 | Backman et al. . |
| 5,534,566 | 7/1996 | Wehner et al. . |
| 5,582,873 | 12/1996 | Desai . |
| 5,645,811 | 7/1997 | Kuhm et al. ........................ 423/700 |
| 5,739,188 | 4/1998 | Desai . |
| 5,833,739 | * 11/1998 | Klatte et al. . |

FOREIGN PATENT DOCUMENTS

| | | |
|---|---|---|
| 0091076 | 10/1983 | (EP) . |
| 0236602 | 9/1987 | (EP) . |
| 0394948 | 10/1990 | (EP) . |
| 59-164618 | 9/1984 | (JP) . |
| 61-295226 | 12/1986 | (JP) . |
| 4097908 | 3/1992 | (JP) . |
| 07108026 | 4/1995 | (JP) . |

OTHER PUBLICATIONS

Journal of Applied Polymer Science, vol. 46, No. 1, Sep. 5, 1992, pp. 119–127, S. Stoeva et al., "Poly(vinyl chloride) Composition. II. Study of the Flammability and Smoke–Evolution of Unplasticized Poly(vinyl chloride) and Fire–Retardant Additives".

Article Entitled, "Standard Test Method for Determination of the Impact Resistance of Thermoplastic Pipe and Fittings by Means of a Tup (Falling Weight)".

Article Entitled, "Standard Specification for Chlorinated Poly (Vinyl Chloride) (CPVC) Plastic Pipe, Schedules 40 and 80".

Article Entitled, "Standard Practice for Fusion of Poly (Vinyl Chloride) (PVC) Compounds Using a Torque Rheometer".

* cited by examiner

Primary Examiner—Tom Dunn
Assistant Examiner—Christina Ildebrando
(74) Attorney, Agent, or Firm—Helen A. Odar; Valerie C. Calloway; Daniel J. Hudak

(57) ABSTRACT

The present invention relates to zeolites and the process for forming such zeolites. In addition, the instant invention relates to modified zeolites having a reduced water content while retaining the reactivity toward the acid species. The reduction in the water content is achieved by shock annealing or coating. The modified zeolite is useful as a stabilizer for halogen containing polymers.

18 Claims, No Drawings

… … …

MODIFIED ZEOLITES AND METHODS OF MAKING THEREOF

FIELD OF INVENTION

This invention relates to small particle size zeolites which have a small mean particle size, and narrow particle size distribution. In addition, this invention relates to modified zeolites that have a reduced water content. The modified zeolites can be formed from large particle size zeolites having a narrow particle size distribution as well as small particle size zeolites having a narrow particle size distribution. These modified zeolites which retain reactivity toward acid species such as HCl yet exhibit minimal water absorption are particularly useful as stabilizers in halogen containing polymers. Furthermore, the invention relates to a method of preparing the small particle size zeolites as well as modified zeolites.

BACKGROUND OF THE INVENTION

Zeolites are highly crystalline materials containing tetra-coordinated aluminum atoms, each associated through four oxygen atoms with adjacent silicon atoms in the crystalline matrix. These zeolites tend to have large particle sizes. For example, commercially available zeolite 4A has a particle size of about 3 to about 6 microns. Furthermore, due to the microporous structure of the zeolite, the material absorbs moisture. Therefore, often times the zeolites are used as adsorbents. Additionally, zeolites are used as catalysts. Various processes have been used to form zeolites.

For example, U.S. Pat. No. 3,528,615 describes a method of reducing the particle size of crystalline zeolites. In this process, the zeolite is heated to an elevated temperature. This temperature is below the temperature at which the loss of crystallinity occurs. The heated zeolite is then quenched in a liquid medium which is maintained below the elevated temperature. The thermal shock fractures the zeolite to produce smaller crystals without a significant reduction in the crystallinity.

Another example of a prior art process for zeolites is disclosed in U.S. Pat. No. 4,581,214. This patent discloses a shock calcination method. According to this method, the zeolite is precalcined at a relatively low temperature. The zeolite is then heated to a relatively high calcination temperature for a relatively short period of time because prolonged exposure of the zeolite to the high temperature would destroy the original structure of the zeolite. The patentee notes that it is very important to prevent mineralization reactions from occurring by this rapid heating steps. The zeolite is then rapidly cooled. The process described in U.S. Pat. No. 4,581,214 alters the zeolite surface acidity. This zeolite is then used as a catalyst.

Zeolites are effective acid scavengers for halogen containing polymers and enhance the thermal stability of halogen containing polymers. Acid scavengers are compounds that react with acids to form a compound that is typically chemically inert. However, the use of zeolites as stabilizers or acid scavengers in halogen containing polymer compounds has been limited for several reasons. First, the zeolites generally have a large particle size, generally in the range of about 3 to about 6 microns. The large size of the zeolite particles not only causes surface blemishes on the finishing of the end product made from such a polymer but also diminishes the physical properties of such polymers. Further, outgassing occurs frequently with polymers containing zeolites when the polymer is heated during processing due to the evolution of water from the zeolite during the heating. As a result, there is foaming.

Halogen containing polymers tend to degrade or deteriorate when processed. Generally, the difference between the processing temperature and the degradation temperature is very small. Therefore, there is a risk that during the processing of these halogen containing polymers, that the polymer will degrade. When such polymers degrade, it is believed that a halide acid is generated by the polymer. This acid attacks the components of the processing equipment. Also, this acid further catalyzes elimination reactions and additional degradation of the polymer.

Stabilizers have been developed to help deter such degradation. For example, organic compounds are commonly used. In some instances, zeolites have also been used as stabilizers.

U.S. Pat. No. 4,000,100 discloses a thermal and light stabilized polyvinyl chloride resin. The stabilizer used in the composition comprises an unactivated zeolite A molecular sieve or an unactivated naturally occurring molecular sieve of essentially the same pore size range as zeolite A and a conventional inorganic, organometallic or organic stabilizer. The unactivated zeolite molecular sieve has adsorbed water molecules. According to the patentee, the combination of the unactivated zeolite and the conventional stabilizer produces a compound with allegedly improved stability as compared to a compounds produced with either of the two stabilizers separately.

Similarly, U.S. Pat. No. 4,338,226 discloses a process for the stabilization of polyvinyl chloride and stabilizer compositions. The patent describes admixing sodium aluminosilicate of small particle size (preferably, 0.1 to 20 microns), calcium salts of fatty acids, zinc salts of fatty acids, partial esters of polyols and fatty acids, thioglycolic acid esters of polyols and polyvinyl chloride or copolymer of vinyl chloride. An aluminosilicate that can be used is crystalline sodium zeolite A. The composition is used for molding mixtures.

U.S. Pat. No. 4,371,656 describes a metal substituted zeolite for use as a stabilizer for halogen containing resins. The stabilizer comprises a crystalline aluminosilicate substituted with ions of metallic elements belonging to Group II or Group IVA of the Periodic Table for the Group I (M) metal ion contained in the aluminosilicate. The stabilizer also must contain 10% by weight or less as $M_2O$ of residual Group I metal ions. The stabilizer, zeolite A, according to the patentee claims to have a water content of 8% by weight or less. This patent also discloses the use of organic substances to cover the voids of the zeolite particles and prevent moisture reabsorption.

Stabilized chloride containing resins are also described in U.S. Pat. No. 5,004,776. The stabilizer consists essentially of: (a) an overbased alkaline earth metal carboxylate or phenolate complex; (b) zeolite; (c) calcium hydroxide; and (d) a complex of at least one metal perchlorate selected from the group consisting of sodium, magnesium, calcium, and barium perchlorates with at least one compound selected from the group consisting of polyhydric alcohols and their derivatives. This stabilizer apparently prevents the discoloration and deterioration in physical properties of the chlorine containing resin resulting from thermal degradation when the resin is subject to thermoforming or exposed to a high temperature atmosphere for a long period of time.

Stabilizer compositions for use in halogen containing polymer are also described in U.S. Pat. No. 5,216,058. The stabilizer composition comprises hydrotalcite and a molecular sieve zeolite. The molecular sieve zeolite comprises a Group IA or IIA aluminosilicate.

Thus, there currently exists a need for an zeolite having a small particle size and a narrow particle size distribution. Furthermore, a need exists for a modified zeolite having a reduced water content while retaining reactivity with acid species. Preferably, the water content is less than 10 weight percent. The modified zeolite can be comprised a zeolite having a mean diameter greater than 1.5 microns with a narrow particle size distribution, or a zeolite having a mean particle diameter less than 1.5 microns and a narrow particle distribution, or a mixture of the two. In addition, a need exists for a modified zeolite which maintains its stabilizing activity. Moreover, a need exists for a method to form such small particle size zeolite and modified zeolite.

SUMMARY OF THE INVENTION

The present invention comprises a novel small particle size zeolite. The small particle size zeolite has a mean particle diameter in the range of about 0.25 to about 1.5 microns and a <90% particle diameter value (90% by weight of the particles are of a particle diameter below the range) of about 0.30 to about 3.0 microns. Another aspect of the invention is a method of preparing such a small particle size zeolite.

A further aspect of the invention is a modified zeolite. The modified zeolite comprises a small particle size zeolite having a narrow particle size distribution or a large particle size having a narrow particle size distribution or a mixture of the two particles. These particles are then either shock annealed, or coated to produce a modified zeolite which is reactive toward acid species such as HCl. If used in halogen containing compounds, these zeolites improve the process stability of the compound without adversely diminishing its physical properties.

DETAILED DESCRIPTION

Zeolites are well known. Zeolites comprise basically of a three dimensional framework of $SiO_4$ and $AlO_4$ tetrahedra. The tetrahedra are crosslinked through the sharing of oxygen atoms so that the ratio of oxygen atoms to the total of the aluminum and silicon atoms it equal to 2. This relationship is expressed as $O/(Al+Si)=2$. The electrovalence of the tetrahedra containing aluminum and silicon is balanced in the crystal by the inclusion of a cation. For example, the cation can be an alkali or alkaline earth metal ion. The cation can be exchanged for another depending upon the final usage of the aluminosilicate zeolite. The spaces between the tetrahedra of the aluminosilicate zeolite are usually occupied by water. Zeolites can be either natural or synthetic.

The basic formula for all aluminosilicate zeolites is represented as follows:

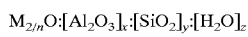

$$M_{2/n}O:[Al_2O_3]_x:[SiO_2]_y:[H_2O]_z$$

wherein M represents a metal, n represents the valence of the metal and X and Y and Z vary for each particular aluminosilicate zeolite. Essentially it is believed that any aluminosilicate zeolite according to the instant invention can be used as a stabilizer in halogen containing compounds, provided that the ratio of the silicon to aluminum in such aluminosilicate zeolite is less than 3.0 and the aluminosilicate zeolite can be incorporated into the halogen containing polymer. Preferably, the ratio of the silicon to aluminum in the aluminosilicate zeolite is less than 1.5 and most preferably the ratio is about 1.0.

It is further believed that the following zeolites which can be used in the instant invention include but are not limited to zeolite A, described in U.S. Pat. No. 2,822,243; zeolite X, described in U.S. Pat. No. 2,822,244; zeolite Y, described in U.S. Pat. No. 3,130,007; zeolite L, described in Belgian Patent No. 575,117; zeolite F, described in U.S. Pat. No. 2,996,358; zeolite B, described in U.S. Pat. No. 3,008,803; zeolite Q, described in U.S. Pat. No. 2,991,151; zeolite M, described in U.S. Pat. No. 2,995,423; zeolite H, described in U.S. Pat. No. 3,010,789; zeolite J, described in U.S. Pat. No. 3,011,869; and zeolite W, described in U.S. Pat. No. 3,102,853.

The preferred zeolites include alone or in combination with another Group I metal hydrated silicates of aluminum incorporating sodium of the type $Na_2O \cdot xAl_2O_3 \cdot ySiO_2 \cdot zH_2O$. These preferred zeolites include zeolites A, X, and Y. The most preferred zeolite is zeolite 4A. Zeolite 4A, preferably has the following formula:

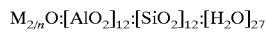

$$M_{2/n}O:[AlO_2]_{12}:[SiO_2]_{12}:[H_2O]_{27}$$

wherein M is sodium.

Any method can be used to form such small particle size zeolites provided that the mean particle diameter of the zeolite is less than 1.5 microns, and the zeolite has a <90% value particle diameter of about 0.30 to about 3 microns.

Depending upon the final usage of the small particle size zeolite, it may be desirable to incorporate an active metal other than the metal which was used to synthesize the small particle size zeolite. This can be accomplished by any numerous means such as for example, ion exchange, impregnation, coprecipitation, cogelation. Alternatively, the metal may be added by synthesis.

A relatively simple process is used in the preparation of the small particle size zeolite of the instant invention. First, the zeolite is synthesized. The exact synthesis will vary dependent upon the specific zeolite being used; this synthesis is well within the skill of one of ordinary skill in the art. Generally, however, a mixture of the aqueous solution of the materials which can be represented as mixtures of oxides, $Na_2O$; $Al_2O_3$; $SiO_2$ and $H_2O$ are reacted at a temperature in the range of about 50° C. to about 100° C. for a period of about 45 minutes to about 2000 minutes. Alternatively, the mixture of the reactants are allowed to age from about 0.1 to 48 hours at ambient conditions prior to the crystallization step. Preferably, the temperature of the reaction is in the range of about 50° C. to about 80° C. and the reaction is carried out for about 60 to 420 minutes. Most preferably, the temperature is 60° C. to 70° C. with a reaction of time of 90 to 300 minutes. The result of this reaction is a zeolite having a mean particle size in the range of about 0.25 to 1.5 microns. The <90% particle size value is in the range of 0.30 to 3.0 microns.

After the small particle size zeolite is formed, it is washed. Preferably, the small particle size zeolite is washed in deionized water. For example, the small particle size zeolite may be washed four times with deionized water. The washed small particle size zeolite is then filtered and dried at 100–200° C. Any means can be used to dry the small particle size zeolite, including air drying. After being dried, the small particles are then dehydrated at about 250 to about 500° C. Any means available to dehydrate the small particle sized zeolite can be used, including but not limited to furnace dehydration. It is believed that the small particle sized zeolite has better reactivity when incorporated into halogen containing polymers if it is dried. If furnace dehydrated, any suitable furnace can be used provided that the desired temperature can be reached. Generally if furnace dehydrated, the zeolite is heated to the range of about 250 to 500° C. for about 2 to 6 hours. Alternatively, the small particle size zeolite can be dehydrated in vacuo at approximately 200° C. for about 2 to about 6 hours.

The small particle size zeolites formed according to the instant invention can be used in any application in which small particle size zeolites are desired. For example, these small particle size zeolites can be used as adsorbents, absorbents, or thickening agents. Additionally, the small particle size zeolites can be used for enhancing the thermal stability of halogenated polymers, while maintaining the desired physical properties of the polymers.

In another embodiment of the instant invention, zeolite particles are modified. Modified zeolite particles have a water content of less than ten weight percent. The particles can be modified by chemically altering the surface of the zeolite particles or by shock annealing the zeolite particles or by coating the zeolite particles, or a combination of shock annealing and coating.

The zeolite particles used to form the modified zeolite particles can be either small size zeolite particles having a narrow particle size distribution or large zeolite particles having a narrow particle size distribution. For purposes of the modified zeolite particles, small particle zeolites are those having a mean particle diameter in the range of about 0.25 to about 1.5 microns and a <90% particle diameter value in the range of about 0.30 to about 3.0 microns. The small size zeolite particles can be formed by the process described above or any other process provided that the desired size and distribution are obtained. Most preferably, the small size zeolite particles are formed by the above process. Likewise, for the purposes of large particle size zeolites to be used in the modified zeolite, these particles have a mean particles size greater than or equal to 1.5 microns and a distribution of about 90% within the limits represented by ¼ times the median at the lower limit and 2 times the median at the upper limit.

Furthermore, these modified zeolites if added to a halogen containing compound should impart process stability to the compound without adversely diminishing its physical properties. The modification prevents the zeolite particles from absorbing water but still allows the zeolite particles to react with the acid released upon the deterioration or degradation of the halogen containing polymer when processed.

If coating is the method used for the modification of the zeolite particles, an organic, inorganic or low molecular weight (<10,000) coating or coating mixture can be used provided that it has the following characteristics. First, in the case of inorganic coatings, they cannot be redox active; namely, the composition should have its d shell filled. Second, the coating cannot be water soluble or water permeable. Third, the coating should be reactive or permeable to the halogen acid. Fourth, the coating should not be a Lewis Acid. Preferably, the coating used is miscible with the halogen containing polymer. Examples of suitable coatings include oxides such as magnesium oxide, paraffin waxes, low molecular weight organic matrices such as calcium stearate, high molecular weight matrices such as siloxanes, and acrylic polymers such as methacrylate polymers. Preferably the coating is either dibutyl tin thioglycote or polydimethylsiloxane. A commercially available dibutyl tin thioglycolate is Mark 292 from Witco Chemical. A commercially available polydimethylsiloxane is SF100, available from GE Plastics.

The coating can be prepared in situ during the formation of the zeolite particles or applied to the zeolite particles in a separate step. If applied in a separate step, care should be taken to ensure the uniform application of the coating as well as to avoid clumping. Furthermore, the coating cannot be too thick or too thin, therefore, a balance must be obtained so as to ensure low water absorption but retain activity of the zeolite particles as acid scavenger.

Alternatively, the zeolite particles can be modified by shock annealing the particles. With the use of a shock annealing process for the zeolite particles, a phase transformation occurs at the outer surface of the zeolite particle shell. It is believed that the phase transformation causes the collapse of the zeolite structure at the outer surface. The shock annealing occurs at a temperature above the phase transformation temperature of the zeolites followed by rapid cooling. The shock annealing is carried out for the appropriate time to cause the outer surface of the particles to collapse. Exposure time to this temperature above the phase transformation temperature is however limited to minimize the bulk absorption of thermal energy and to limit the phase transformation to the outer surface of the particles. The temperature at which the zeolite is heated during the shock annealing process is dependent upon the particular zeolite being shock annealed. The temperature as well as the time to shock anneal is well within the skill of one of ordinary skill in the art.

For example, in one approach to shock annealing, the zeolite particles are then placed in a furnace during the shock annealing step. Preferably, the particles are placed in a preheated crucible which can be made from quartz, high temperature steels or aluminum oxide. The crucible with the particles is returned to a muffle furnace. Any furnace can be used so long as it reaches the desired temperature. In the most preferred embodiment, an aluminum oxide crucible containing small particle size zeolites is preheated to approximately 700 to 1200° C. prior to the addition of a small particle size zeolite.

Once the zeolite is added, it is heated from about 1 to about 30 minutes in the temperature range of about 700 to 1200° C. After the particles are heated, they are rapidly cooled. Any cooling means can be used so long as the temperature is cooled below the phase transformation temperature in a matter of seconds, for example, about 600° C. for zeolite 4A. The particles can be cooled by air, water, carbon dioxide or liquid nitrogen. As a result of this process, a modified zeolite is formed.

The modified zeolite can be used in any application in which zeolites which are nonhygroscopic yet reactive towards acids are desired. For example, the particles can be used as stabilizers for halogen containing polymers, and acid scavenger for polyolefins. The modification prevents the aluminosilicate zeolites from absorbing water while still allowing the particles to react with the acid released upon deterioration or degradation of the halogen containing polymer. If chlorinated polyvinyl chloride is the halogen containing polymer, preferably the water content of the modified aluminosilicate zeolite is less than 8 weight percent. The zeolites formed according to the instant invention maintain their stabilizing activity in halogen containing compounds.

The following non-limiting examples serve to further illustrate the present invention in greater detail.

EXAMPLE I

A zeolite 4A powder was synthesized by individually preparing the following solutions: a sodium silicate solution; a sodium aluminate solution; and a sodium hydroxide solution.

The sodium silicate solution was prepared by dissolving 255.6 grams of $Na_2SiO_3 \cdot 9H_2O$ in 650 grams of water. The sodium aluminate solution was prepared by dissolving 270.0 grams of $NaAlO_2$ in 320 grams of water wherein the sodium hydroxide solution was prepared by adding 500 grams of NaOH in 650 grams of water. An additional solution of 10.0 grams of $ZnCl_2$ and 90.0 grams of water was also prepared. All solutions were maintained at approximately 55° C. after all solids were dissolved in solution. The sodium hydroxide solution was then added to the sodium aluminate solution while stirring. The resulting sodium aluminate/sodium hydroxide solution was added concurrently with the zinc chloride solution to the sodium silicate solution, again while stirring. The reaction temperature was maintained at 60° C. for 2 hours. The solution was then filtered and rinsed.

The zeolite A powder had a mean particle diameter of 0.9 $\mu$m and <90% value of 1.8 $\mu$m as determined using a Coulter LS Particle Size Analyzer.

A sample dehydrated at 350° C. exhibited a weight gain of 22% after 2 days of exposure to ambient conditions. Generally, commercial zeolite 4A will pick up moisture in the range of about 18 to about 22 weight percent within 48 hours.

The Dynamic Thermal Stability (DTS) measured according to ASTM D 2532 of a TempRite® 3104 CPVC compound (commercially available from The B.F.Goodrich Company; TempRite is a registered trademark of The B.F.Goodrich Co.) was evaluated with and without the above zeolite A described above using a Brabender torque rheometer set at a 208° C. bowl temperature, 35 rpm and a 70 gram loading. The DTS time of the TempRite® 3104 CPVC control was 13 minutes. With the addition of 3 parts per hundred resin (phr) of the zeolite 4A prepared according to Example I to the TempRite® 3104 compound, the DTS time of the compound was increased to 36 minutes. This example illustrates a 157% increase over the control value. The DTS increase is defined as ($DTS_{zeolite\ containing} - DTS_{control\ (no\ zeolite)}/DTS_{control} \times 100\%$). A longer DTS time is indicative of a compound with enhanced stability.

EXAMPLE II

A 20.0 gram portion of a dehydrated zeolite prepared according to Example I was calcined by gradually heating to 840° C. for 1 hour and gradually cooled to room temperature under vacuum. The resulting material exhibited virtually no weight gain due to water uptake upon exposure to ambient conditions for 500 hours. The DTS time of the TempRite® 3104 CPVC control was unchanged upon addition of 3 phr of the calcined zeolite. (0% increase over control DTS value indicating that the zeolite has lost its reactivity under these calcination conditions).

EXAMPLE III

An 100 mL $Al_2O_3$ crucible was heated to 840° C. in a muffle furnace. The crucible was removed from the furnace and a 20.0 gram portion of a dehydrated zeolite prepared according to Example I was added to the crucible which was then returned to the furnace and heated for 15 minutes. The heated zeolite powder was then poured into another crucible at room temperature immediately after removal from the muffle furnace. The resulting material exhibited 0.7% weight gain due to water uptake upon exposure to ambient conditions after 48 hours. The DTS time of the TempRite® 3104 CPVC control was increased upon addition of 3 phr of the shock-annealed zeolite from 13 minutes to 30 minutes (131% increase over control DTS value). This example demonstrates the synthesis of a zeolite which is non-hygroscopic yet active as a polymer stabilizer.

EXAMPLES IV–XX

Another zeolite 4A powder was synthesized by individually preparing the following solutions: (1) a sodium silicate solution; (2) a sodium aluminate solution; and (3) a sodium hydroxide solution. The sodium silicate solution was prepared by dissolving 255.6 grams of $Na_2SiO_3 \cdot 9H_2O$ and 10 grams of $C_{11}H_{23}COOH$ in 650 grams of water. The sodium aluminate solution was prepared by dissolving 270.0 grams of $NaAlO_2$ in 320 grams of water and the sodium hydroxide solution was prepared by adding 500 grams of NaOH in 650 grams of water. An additional solution of 10.0 grams of $ZnCl_2$ and 90.0 grams of water was also prepared. All solutions were maintained at approximately about 55° C. after all solids were dissolved. The sodium hydroxide solution was then added while the solution was stirred to the sodium aluminate solution. The resulting sodium aluminate/sodium hydroxide solution was added concurrently with the zinc chloride solution to the sodium silicate solution, again while stirring. The reaction temperature was maintained at about 60° C. for 2 hours. The product was filtered and rinsed.

A 100 ml $Al_2O_3$ crucible was heated to 840° C. in a muffle furnace. The crucible was extracted from the furnace and a 20.0 gram portion of a dehydrated zeolite prepared according to Example I was added to the crucible which was then returned to the furnace and heated for 15 minutes. The heated zeolite powder was then poured into a stainless steel cup; and cooled with dry ice immediately after removal from the furnace. The resulting material exhibited 0.4% weight gain due to water uptake upon exposure to ambient conditions after 48 hours. The DTS time of the TempRite® 3104 CPVC compound control was increased upon addition of 3 phr of the shock-annealed zeolite A, prepared as discussed above from 14 minutes to 29 minutes (107% increase over control DTS value). Similarly prepared zeolites were shock-annealed according to the parameters listed below. The (s) in the subscript $CO_{2(s)}$ means the carbon dioxide was solid.

TABLE I

| Example | Coolant | Temperature (° C.) | Time (min.) | $H_2O$ Uptake (%) | DTS (min) | % increase in DTS |
|---|---|---|---|---|---|---|
| 4 | air | 840 | 15 | 0.8 | 30.5 | 118% |
| 5 | air | 840 | 15 | 1.0 | 33.6 | 140% |
| 6 | air | 790 | 20 | 1.1 | 28.0 | 100% |
| 7 | air | 830 | 15 | 1.1 | 33.4 | 139% |
| 8 | air | 785 | 20 | 1.2 | 30.5 | 118% |
| 9 | air | 810 | 15 | 1.5 | 33.3 | 138% |
| 10 | $CO_2(s)$ | 840 | 15 | 0.4 | 29.4 | 110% |
| 11 | $CO_2(s)$ | 820 | 15 | 0.8 | 33.6 | 140% |
| 12 | $CO_2(s)$ | 830 | 15 | 0.9 | 33.0 | 136% |
| 13 | $CO_2(s)$ | 810 | 15 | 1.1 | 31.9 | 128% |
| 14 | $CO_2(s)$ | 820 | 15 | 1.5 | 34.0 | 143% |
| 15 | $CO_2(s)$ | 800 | 15 | 3.9 | 31.4 | 124% |
| 16 | $CO_2(s)$ | 840 | 10 | 4.4 | 33.3 | 138% |
| 17 | $CO_2(s)$ | 790 | 15 | 5.7 | 32.5 | 132% |
| 18 | $CO_2(s)$ | 820 | 10 | 6.7 | 31.0 | 121% |
| 19 | $CO_2(s)$ | 750 | 15 | 8.0 | 34.0 | 143% |
| 20 | $CO_2(s)$ | 770 | 15 | 10.5 | 34.5 | 146% |

These examples show that a balance of reactivity (DTS) and % $H_2O$ uptake can be achieved with various conditions (temperature, time, cooling conditions).

EXAMPLES XXI–XXXII

Another series of zeolite 4A powders were synthesized by individually preparing the following solutions: (1) a sodium silicate solution; (2) a sodium aluminate solution; and (3) a sodium hydroxide solution. The sodium silicate solution was prepared by dissolving 255.6 grams of $Na_2SiO_3 \cdot 9H_2O$ in 650 grams of water. The sodium aluminate solution was prepared by dissolving 270.0 grams of $Na_2AlO_3$ in 320 grams of water, and the sodium hydroxide solution was prepared by adding 500 grams of NaOH in 650 grams of water. All solutions were maintained at about 55° C. after all solids were dissolved. An additional solution of 10.0 grams of $ZnCl_2$ and 90.0 grams of water was also prepared and used as shown in the table below. 10 grams of $C_{11}H_{23}COOH$ was also added to the sodium silicate solution as also shown in Table II below. The sodium hydroxide solution was then added with stirring to the sodium aluminate solution. The resulting sodium aluminate/sodium hydroxide solution was added concurrently with the zinc chloride solution (when used) to the sodium silicate solution, again with stirring. The reaction temperature was maintained at 60° C. for 2 hours and then filtered and rinsed.

In the several of the experiments, shock annealing was used. A 100 mL $Al_2O_3$ crucible was heated to 840° C. in a muffle furnace. The crucible was extracted from the furnace and a 20.0 gram portion of a dehydrated zeolite prepared accordingly was added to the crucible which was then returned to the furnace and heated for 15 minutes. The heated zeolite powder was then poured into a $Al_2O_3$ crucible at room temperature and cooled immediately after removal from the furnace. The resulting material exhibited the weight gain tabulated below due to water uptake upon exposure to ambient conditions after 48 hours. The DTS time of the TempRite® 3104 CPVC control was increased upon addition to 3 phr of the respective zeolite from 14 minutes to the values also listed below:

sodium aluminate and sodium hydroxide solutions. The sodium silicate solution was prepared by dissolving 195 g. of $Na_2SiO_3 \cdot 5H_2O$ and 1.5 g. of sodium lauryl sulfate in 525 g. of water. The sodium aluminate solution was prepared by dissolving 115 g. of $NaAlO_2$ in 415 g. of water, wherein the solution of NaOH WAs prepared from 210 g. of NaOH in 420 g. of water. The resulting sodium aluminate/sodium hydroxide solution was added to the sodium silicate solution while stirring at room temperature. A thick gel was formed immediately. The agitation was continued for a couple of minutes until a consistent mixture is obtained. The system was allowed to age for about 16 hours at room temperature. After this period of aging, the agitation was started again and the system was heated to 60° C. The reaction temperature was maintained for 3 hours. The solution was then filtered and rinsed.

The zeolite 4A powder formed by this method as confirmed by X-ray diffraction has a mean particle diameter of 0.35 microns and <90% value of 0.5 microns as determined using a Coulter LS Particle Size Analyzer.

A sample dehydrated at 350° C. exhibited a weight gain of 22.6% after 4 days exposure at ambient conditions. The DTS measured according to ASTM D 2532 in a TempRite® 3104 CPVC compound (commercially available from The B.F.Goodrich Co.) was evaluated with and without the above zeolite 4A using a Brabender torque rheometer set at 208° C. bowl temperature, 35 rpm, and a 70 g. loading. The

TABLE II

| | | | | Particle Size | | | | |
| --- | --- | --- | --- | --- | --- | --- | --- | --- |
| Example # | $ZnCl_2$ added | $C_{11}H_{23}COOH$ added | Shock-annealed | mean diameter (µm) | median diameter (µm) | <90% Particle diameter (µm) | % increase in DTS | $H_2O$ uptake (at 48 hrs.) |
| 21 | yes | yes | yes | 1.4 | 1.1 | 2.9 | 100 | 0.6% |
| 22 | yes | yes | no | 1.7 | 1.2 | 2.5 | 171 | 12.3% |
| 23 | yes | no | yes | 1.5 | 1.1 | 2.6 | 93 | 1.0% |
| 24 | yes | no | no | 1.4 | 1.1 | 2.5 | 150 | 14.1% |
| 25 | no | yes | yes | 2.1 | 1.4 | 5.6 | 79 | 0.5% |
| 26 | no | yes | no | 1.9 | 1.6 | 4.1 | 129 | 10.9% |
| 27 | no | no | yes | 11.8 | 6.9 | 5.6 | 93 | 0.8% |
| 28 | no | no | no | 27.3 | 14.9 | 91.9 | 114 | 2.1% |
| 29 | yes | yes | yes | 1.4 | 1.1 | 2.2 | 93 | 1.0% |
| 30 | no | no | no | 1.9 | 1.5 | 4.7 | 121 | 12.0% |
| 31 | commercial zeolite | commercial zeolite | yes | 4.3 | 4.0 | 7.1 | 57 | 2.8% |
| 32 | commercial zeolite | commercial zeolite | no | 3.9 | 3.6 | 6.5 | 143 | 16.2% |

In Example #28, the zeolite was not formed under the specified conditions. The commercial zeolite used in the above examples was molecular sieve zeolite 4A, having a particle diameter in the range of about 5 microns, available from Aldrich and bearing the product number 23,366–8 (lot #03024 JQ).

This series of examples was designed to examine the effects of $ZnCl_2$, $C_{11}H_{23}COOH$ and shock-annealing on particle size distribution to balance the zeolite reactivity and $H_2O$ uptake. Additionally, the experiment was designed to show the effect of shock-annealing on Dynamic Thermal Stability of the compound. The shock annealing conditions were not optimized for this series.

EXAMPLE XXXIII

Another zeolite 4A powder was synthesized by individually preparing the following solutions: sodium silicate, DTS time of the TempRite® 3104 CPVC control was 20 minutes. However, the DTS time increased to 35 minutes with the addition of 3 parts per hundred resin (phr) of the zeolite 4A prepared according to this example. The addition of the zeolite 4A to the CPVC compound resulted in a 75% increase in thermal stability over the control.

EXAMPLE XXXIV

A commercial zeolite 4A powder (Aldrich product #23, 366–8, lot #03024-JQ) has the following particle size distribution as determined using a Coulter LS Particle Size Analyzer: a mean particle diameter of 2.5 µm, a median particle diameter of 2.4 µm and a <90% value of 4.6 µm. A sample dehydrated at 350° C. exhibited a weight gain of 21% after 2 days of exposure to ambient conditions.

A 100 mL $Al_2O_3$ crucible was heated to 840° C. in a muffle furnace. The crucible was extracted from the furnace and a 20.0 gram portion of the dehydrated commercial zeolite described above was added to the crucible, which was then returned to the furnace and heated for 15 minutes. The heated zeolite powder was then poured into another crucible at room temperature immediately after removal from the furnace. The resulting material exhibited 1.0% weight gain due to water uptake upon exposure to ambient conditions after 48 hours. The DTS time of the TempRite® 3104 CPVC control was increased upon addition of 3 phr of the shock-annealed zeolite from 16 minutes to 31.5 minutes (97% increase in DTS).

EXAMPLE XXXV

A commercial zeolite 4A powder (Aldrich product lot #23,366–8, lot #03024-JQ) has the following particle size distribution as determined using a Coulter LS Particle Size Analyzer: a mean particle diameter of 2.5 µm; a median particle diameter of 2.4 µm; and a <90% value of 4.6 µm. A sample dehydrated at 350° C. exhibited a weight gain of 21% after 2 days of exposure to ambient conditions.

A 100 mL $Al_2O_3$ crucible was heated to 820° C. in a muffle furnace. The crucible was extracted from the furnace and a 20.0 gram portion of a dehydrated commercial zeolite described above was added to the crucible, which was then returned to the furnace and heated for 15 minutes. The heated zeolite powder was then poured into a stainless steel cup cooled with dry ice immediately after removal from the furnace. The resulting material exhibited 3.2% weight gain due to water uptake upon exposure to ambient conditions after 48 hours. The DTS time of the TempRite® 3104 CPVC control was increased upon addition of 3 phr of the shock-annealed zeolite from 13 minutes to 25 minutes (92% increase in DTS).

EXAMPLE XXXVI 3 phr of a shock-annealed commercial zeolite 4A powder (as received-Aldrich product #23,366–8, lot #03024-JQ) was added to a commercial CPVC compound (TempRite® 3104 CPVC). The zeolite had the following particle size distribution a mean particle diameter of 2.5 µm, a median particle size of 2.4 µm and a <90% value of 4.6 µm using a Coulter LS Particle Size Analyzer. The same sample dehydrated at 350° C. exhibited a weight gain of 21% after 2 days of exposure to ambient conditions. The DTS time of the TempRite® 3104 CPVC control was increased upon addition of 3 phr of the commercial zeolite from 13 minutes to 33 minutes (154% increase in DTS). However, staircase drop impact at 22.8° C. dropped 52% (control: 25 ft.lb. vs. compound with zeolite 4A: 12 ft.lb) and hoop stress at 82.2° C. dropped 16% (control: 4900 psi vs. compound with zeolite 4A: 4120 psi) as measured on extruded ¾ in. SDR 11 pipe prepared from TempRite® 3104 CPVC.

EXAMPLE XXXVII 3 phr of shock annealed commercial zeolite 4A powder (Aldrich zeolite 4A, (product #23,366, lot #03024-JQ) shock-annealed at 840° C. for 15 minutes) was added to a commercial CPVC compound (TempRite® 3104 CPVC). The particle size distribution of the shock-annealed zeolite was determined as follows: a mean particle diameter of 3.1 µm; 3.1 µm a median particle diameter of 3.1 µm; and a <90% value of 5.7 µm using a Coulter LS Particle Size Analyzer. The shock-annealed sample exhibited a weight gain due to water uptake of <2% after 2 days of exposure to ambient conditions. The DTS time of the TempRite® 3104 CPVC control was increased from 16 minutes to 33 minutes (106% increase in DTS). However, the staircase drop impact at 22.8° C. dropped 44% (control: 25 ft.lb. vs. compound with shock-annealed zeolite: 14 ft.lb.) and hoop stress at 82.2° C. dropped 9% (control: 4900 psi vs. compound with shock-annealed zeolite: 4460 psi) as measured on extruded ¾ in. SDR 11 pipe prepared from TempRite® 3104 CPVC.

EXAMPLE XXXVIII

Two compounds using PVC 103EPF76 resin from The Geon Company were made in the following manner. The ingredients were mixed in an Henschel mixer at 3500 rpm for 15 min. Strips (2 inches wide and 0.035 inches thick) were extruded at 200° C. via a Haake conical twin screw extruder at 200° C. The zeolite used in this case was prepared as described in Example XXXIII and dried in a furnace at 450° C. before use. Its characteristics are summarized in the following table. Variable Height Impact Test (VHIT) values were measured on the strips to quantify impact properties (ASTM D 4226). The following recipe was used:

| | |
|---|---|
| PVC 103EPF76 | 100 phr |
| Dibutyl tin bis-(2ethylhexylmercapto acetate) | 1.6 |
| Calcium stearate | 1.5 |
| Paraffin wax | 1.5 |
| Oxidized polyethylene | 0.1 |
| Acrylic processing aid | 1.0 |
| Impact modifier | 5 |

The following results were obtained:

TABLE IX

| | Control | Compound 1 |
|---|---|---|
| Zeolite content | 0 | 2 |
| <90% Zeolite Particle diameter (µm) | — | 0.6 |
| Mean Particle diameter (µm) | — | 0.35 |
| $H_2O$ content (%) | — | 0 |
| VHIT values (in.lb./in.) | 2.43 ± 0.18 | 2.45 ± 0.13 |

This example illustrates that a small particle size zeolite with reduced water content yields good impact properties as illustrated by the VHIT values of the PVC strips.

In summary, novel and unobvious modified zeolites have been described as well as the process for forming such zeolites. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

We claim:

1. A modified zeolite comprising:
    modified zeolite particles having a phase transformed outer shell, said modified zeolite particles having a water content of less than 10 weight percent, said modified zeolite particles maintaining reactivity toward acid species, wherein said modified zeolite particles are formed by:
    1) synthesizing zeolite particles having a crystalline structure, and
    2) modifying said zeolite particles by shock annealing so that a phase transformation occurs and causes the crystalline structure of said outer shell of said zeolite particles to be modified.

2. A modified zeolite as claimed in claim 1, wherein said phase transformation is thermally induced at the outer shell of the zeolite particles during shock annealing.

3. A modified zeolite as claimed in claim 1, wherein during the shock annealing, the zeolite particles are heated from about 1 to about 30 minutes to a temperature in the range of about 700° C. to about 1200° C.

4. A modified zeolite as claimed in claim 3, wherein after heating, the zeolite particles are cooled below the phase transformation temperature of the zeolite particles.

5. A modified zeolite as claimed in claim 1, wherein said zeolite particles prior to shock annealing comprise small size particles having a mean diameter in the range of about 0.25 to about 1.5 microns, and a narrow particle size distribution of less than 90 percent particle diameter value in the range of about 0.30 to about 3.0 microns; or large size particles having a mean diameter greater than 1.5 microns and a narrow particle size distribution of about 90 percent within the boundaries represented by ¼ times the median at the lower limit and 2 times the median at the higher limit; or a mixture thereof.

6. A modified zeolite as claimed in claim 5, wherein said zeolite particles prior to shock annealing comprise said small size particles.

7. A modified zeolite as claimed in claim 5, wherein said zeolite particles prior to shock annealing comprise said large size particles.

8. A method of forming modified zeolite particles comprising the steps of:
   synthesizing zeolite particles, said zeolite particles being crystalline,
   modifying the zeolite particles by shock annealing to reduce the water content while retaining reactivity toward acid species, wherein said shock annealing comprises:
   a) heating the zeolite particles to a temperature above a phase transformation temperature of the zeolite particles causing a phase transformation at a crystalline outer shell of said zeolite particles and thereby producing said modified zeolite particles;
   b) cooling said modified zeolite particles below the phase transformation temperature to limit the phase transformation to the outer shell of the modified zeolite particles.

9. A method according to claim 8, wherein during the shock annealing, the zeolite particles are heated to a temperature in the range of about 700° C. to about 1200° C.

10. A process of forming small size modified aluminosilicate zeolites having a narrow particle size distribution and a modified outer shell comprising:
    preparing a solution of sodium silicate;
    preparing a solution of sodium aluminate;
    preparing a solution of sodium hydroxide;
    adding the sodium hydroxide solution to the sodium aluminate solution;
    adding the sodium hydroxide/sodium aluminate solution to the sodium silicate solution allowing the resulting mixture to age for 0.1 to 48 hours prior to crystallization;
    crystallizing zeoliie particles in said mixture;
    washing and drying said zeolite particles;
    shock annealing said zeolite particles by heating the crystallized zeolite particles to a temperature above a phase transformation temperature of the zeolite particles causing the crystalline outer shell to be modified thereby forming said modified zeolite particles; and
    cooling said modified zeolite particles below the phase transformation temperature to limit the phase transformation to the outer shell of the modified zeolite particles.

11. A process according to claim 10, wherein said zeolite particles prior to shock annealing comprise mall size particles having a mean diameter in the range of about 0.25 to about 1.5 microns, and a narrow particle size distribution of less than 90 percent particle diameter value in the range of about 0.30 to about 3.0 microns.

12. A method of forming modified zeolite particles comprising the steps of:
    synthesizing the zeolite particles, the zeolite particles having a crystalline structure,
    dehydrating the zeolite particles,
    modifying the zeolite particles by shock annealing to reduce the water content while retaining reactivity toward acid species, said shock annealing comprising the steps of:
    a) heating the zeolite particles to a temperature above a phase transformation temperature of the zeolite particles causing a phase transformation at a crystalline outer shell thereby producing said modified zeolite particles, and
    b) cooling said modified zeolite particle below the phase transformation temperature to limit the phase transformation to the outer shell of the modified zeolite particles.

13. A method according to claim 12, wherein during the shock annealing, the zeolite particles are heated to a temperature in the range of about 700° C. to about 1200° C.

14. A method according to claim 13, wherein after heating, the modified zeolite particles are cooled below the phase transformation temperature of the zeolite particles.

15. A method according to claim 12, wherein said zeolite particles prior to shock annealing comprise small size particles having a mean diameter in the range of about 0.25 to about 1.5 microns, and a narrow particle size distribution of less than 90 percent particle diameter value in the range of about 0.30 to about 3.0 microns; or large size particles having a mean diameter greater than 1.5 microns and a narrow particle size distribution of about 90 percent within the boundaries represented by ¼ times the median at the lower limit and 2 times the median at the higher limit; or a mixture thereof.

16. A method according to claim 15, wherein said zeolite particles prior to shock annealing comprise said small size particles.

17. A method according to claim 15, wherein said zeolite particles prior to shock annealing comprise said large size particles.

18. A small particle size modified aluminosilicate zeolite comprising modified zeolite particles having a phase transformed outer shell, said modified zeolite particles having a water content of less than 10 weight percent, said modified zeolite particles maintaining reactivity toward acid species, formed by a process comprising the following steps:
    preparing a solution of sodium silicate;
    preparing a solution of sodium aluminate;
    preparing a solution of sodium hydroxide;
    preparing a solution of zinc chloride;
    adding the sodium hydroxide solution to the sodium aluminate solution;

adding the sodium hydroxide/sodium aluminate solution and the zinc chloride solution to the sodium silicate solution allowing the resulting mixture to age without mixing for 0.1 to 48 hours prior to a crystallization step;

crystallizing zeolite particles;

heating the zeolite particles to a temperature above a phase transformation temperature of the zeolite particles causing the crystalline outer shell to be modified thereby forming said modified zeolite particles, and cooling the modified zeolite particles below the phase transformation temperature to limit the phase transformation to the outer shell of the modified zeolite particles.

\* \* \* \* \*